US012719749B2

(12) United States Patent
Abe et al.

(10) Patent No.: US 12,719,749 B2
(45) Date of Patent: Aug. 25, 2026

(54) CONVERSION DEVICE, CONVERSION METHOD, AND CONVERSION PROGRAM

(71) Applicant: NTT, INC.

(72) Inventors: Shinji Abe, Tokyo (JP); Yasuyuki Niihara, Tokyo (JP); Atsushi Suto, Tokyo (JP); Hiroki Inoue, Tokyo (JP); Hiroki Hosono, Tokyo (JP)

(73) Assignee: NTT, Inc., Tokyo (JP)

( * ) Notice: Subject to any disclaimer, the term of this patent is extended or adjusted under 35 U.S.C. 154(b) by 57 days.

(21) Appl. No.: 18/837,993

(22) PCT Filed: Feb. 17, 2022

(86) PCT No.: PCT/JP2022/006492

§ 371 (c)(1),
(2) Date: Aug. 13, 2024

(87) PCT Pub. No.: WO2023/157201

PCT Pub. Date: Aug. 24, 2023

(65) Prior Publication Data

US 2025/0150341 A1 May 8, 2025

(51) Int. Cl.
*G06F 15/16* (2006.01)
*H04L 41/084* (2022.01)

(52) U.S. Cl.
CPC ................................ *H04L 41/0846* (2013.01)

(58) Field of Classification Search
CPC ....................... H04L 41/0846; H04L 41/0813; H04L 41/084
See application file for complete search history.

(56) References Cited

U.S. PATENT DOCUMENTS 9,866,436 B2 * 1/2018 Savla .................... H04L 41/122
11,528,190 B2 * 12/2022 Mallipudi ............... H04L 67/14
2006/0056315 A1 * 3/2006 Oman ................. H04L 41/0836 370/254
2011/0029546 A1 * 2/2011 Mineno ................. G06F 16/258 707/756
2011/0289304 A1 * 11/2011 Peters ................. H04L 41/0813 713/1
2015/0271016 A1 * 9/2015 Seligson ............. H04L 41/0813 709/220
2018/0176077 A1 * 6/2018 Kanakarajan ........... H04L 41/08
2018/0210880 A1 * 7/2018 Thomas ................ G06F 16/214
2019/0102215 A1 * 4/2019 Sethuramalingam ........................ G06F 9/45558
2019/0129742 A1 * 5/2019 Hasegawa ........... G06F 9/45558
2019/0190779 A1 * 6/2019 Lei ............................ G06F 1/24
2019/0394200 A1 * 12/2019 Godier .................. H04L 9/0866

(Continued)

FOREIGN PATENT DOCUMENTS

JP 2008027127 A 2/2008
JP 2011049695 A 3/2011

(Continued)

*Primary Examiner* — Razu A Miah

(57) ABSTRACT

A conversion device of an embodiment converts a command included in a configuration extracted from a first network device that transfers data in a network, into a command that can be set in a second network device that receives data in the network. The conversion device generates a configuration that can be input to the second network device, on the basis of a command obtained as a result of conversion.

10 Claims, 6 Drawing Sheets

(56) References Cited

U.S. PATENT DOCUMENTS

| | | | | |
|---|---|---|---|---|
| 2020/0358859 | A1* | 11/2020 | Gupta | H04L 67/148 |
| 2022/0103427 | A1* | 3/2022 | Mallipudi | G06F 8/65 |
| 2023/0102397 | A1* | 3/2023 | Atri | H04L 41/0843 709/221 |

FOREIGN PATENT DOCUMENTS

| | | | |
|---|---|---|---|
| JP | 2015153344 | A | 8/2015 |
| JP | 2015222465 | A | 12/2015 |
| JP | 2020046822 | A | 3/2020 |

* cited by examiner

CONVERSION DEVICE, CONVERSION METHOD, AND CONVERSION PROGRAM

CROSS-REFERENCE TO RELATED APPLICATIONS

This application is a U.S. 371 Application of International Patent Application No. PCT/JP2022/006492, filed on 17 Feb. 2022, the disclosure of which is hereby incorporated herein by reference in its entirety.

TECHNICAL FIELD

The present invention relates to a conversion device, a conversion method, and a conversion program.

BACKGROUND ART

When a network device (NW (Network) device, hereinafter) constituting a network is replaced, there is a case where an operation for transferring setting information (configuration, hereinafter) from a NW device before replacement to a NW device after replacement needs to be performed.

There has conventionally been known a technique for migrating data of a server providing a service to another server (see, for example, PTL 1).

CITATION LIST

Patent Literature

[PTL 1] Japanese Patent Application Publication No. 2015-222465

[PTL 2] Japanese Patent Application Publication No. 2015-153344

[PTL 3] Japanese Patent Application Publication No. 2011-049695

SUMMARY OF INVENTION

Technical Problem

However, the conventional techniques have a problem of not being able to efficiently replace NW devices with different configuration systems.

In the NW devices before and after the replacement, vendors may be different from each other. In this case, each NW device may have different configuration systems such as setting logic and setting grammar.

According to the technique described in PTL 1, it is difficult to normally migrate the configuration in consideration of such a difference in configuration system.

Solution to Problem

In order to solve the above problem and achieve the object, a conversion device includes: a conversion unit that converts a command included in a configuration extracted from a first NW device that transfers data in a network, into a command that can be set in a second NW device that transfers data in the network; and a generation unit that generates a configuration that can be input to the second NW device, on the basis of a command obtained as a result of conversion by the conversion unit.

Advantageous Effects of Invention

According to the present invention, it is possible to efficiently replace NW devices having different configuration systems.

DESCRIPTION OF EMBODIMENTS

Embodiments of a conversion device, a conversion method, and a conversion program according to the present application will be described below in detail with reference to the drawings. Note that the present invention is not limited to the embodiments to be described below.

Structure of First Embodiment

Figure 1:
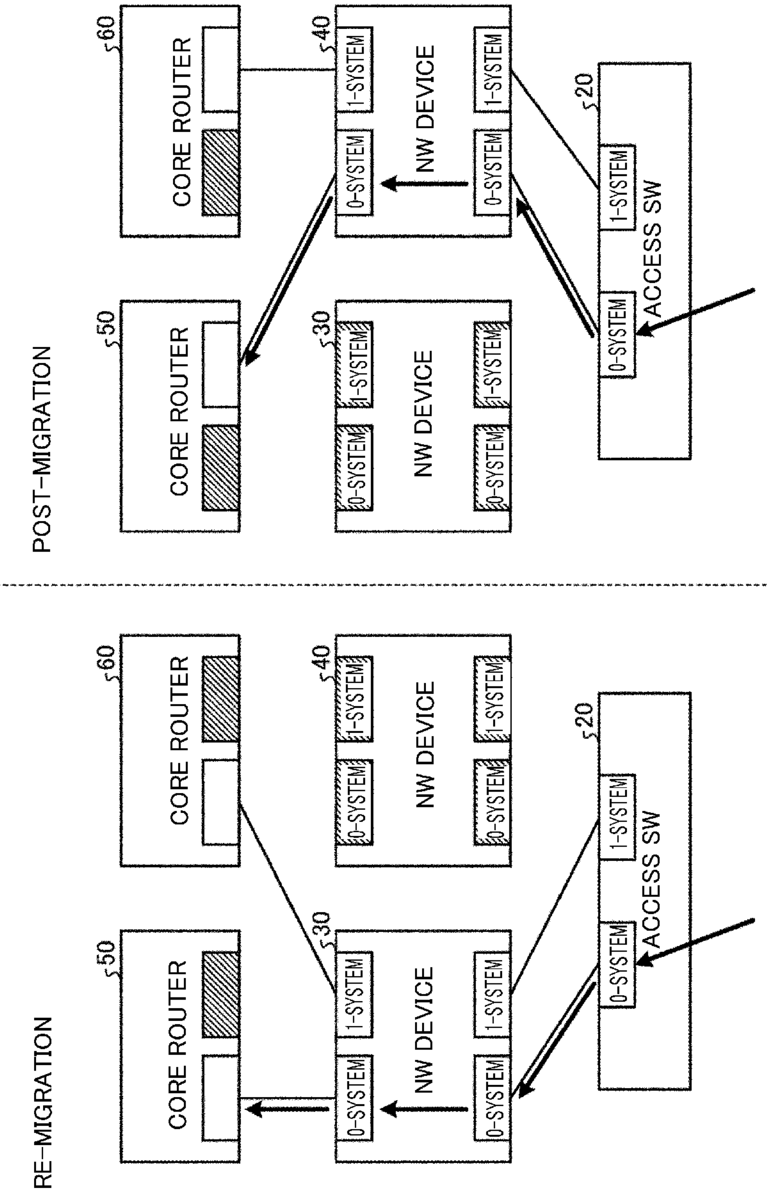
FIG. 1 is a diagram showing a configuration example of a network before and after configuration migration.

First, a network in which an NW device to which a configuration is migrated is arranged will be described with reference to FIG. 1. FIG. 1 is a diagram showing a configuration example of a network before and after configuration migration.

As shown in FIG. 1, the network includes an access SW (switch) 20, an NW device 30, an NW device 40, a core router 50, and a core router 60. For example, IP packets are transferred between devices of the network.

The network in FIG. 1 is part of a core network and a user network. The access SW 20 is arranged in the user network. The core router 50 and the core router 60 are arranged in the core network.

The NW device 30 and the NW device 40 are edge routers arranged at an edge of the core network. In this case, the access SW (switch) 20, the core router 50, and the core router 60 are opposite devices to the NW device 30 and the NW device 40.

The NW device to which a configuration is migrated is not limited to the edge router; other routers, switches, and the like may be used. Further, the configuration of the network in which NW devices to which the configuration is migrated are arranged is not limited to the one shown in FIG. 1.

As shown in FIG. 1, the NW device 30 and the NW device 40 have two paths, i.e., 0-system and 1-system.

Before the configuration is migrated, a packet transferred from the access SW 20 is transferred to the core router 50 and the core router 60 via the 0-system or 1-system of the NW device 30.

On the other hand, after the configuration is migrated, the packet transferred from the access SW 20 is transferred to the core router 50 and the core router 60 via the 0-system or 1-system of the NW device 40.

When the NW device 30 is replaced with the NW device 40 in this manner, it is necessary to migrate the configuration from NW device 30 to NW device 40 as well as reconnect the physical wiring.

Figure 2:
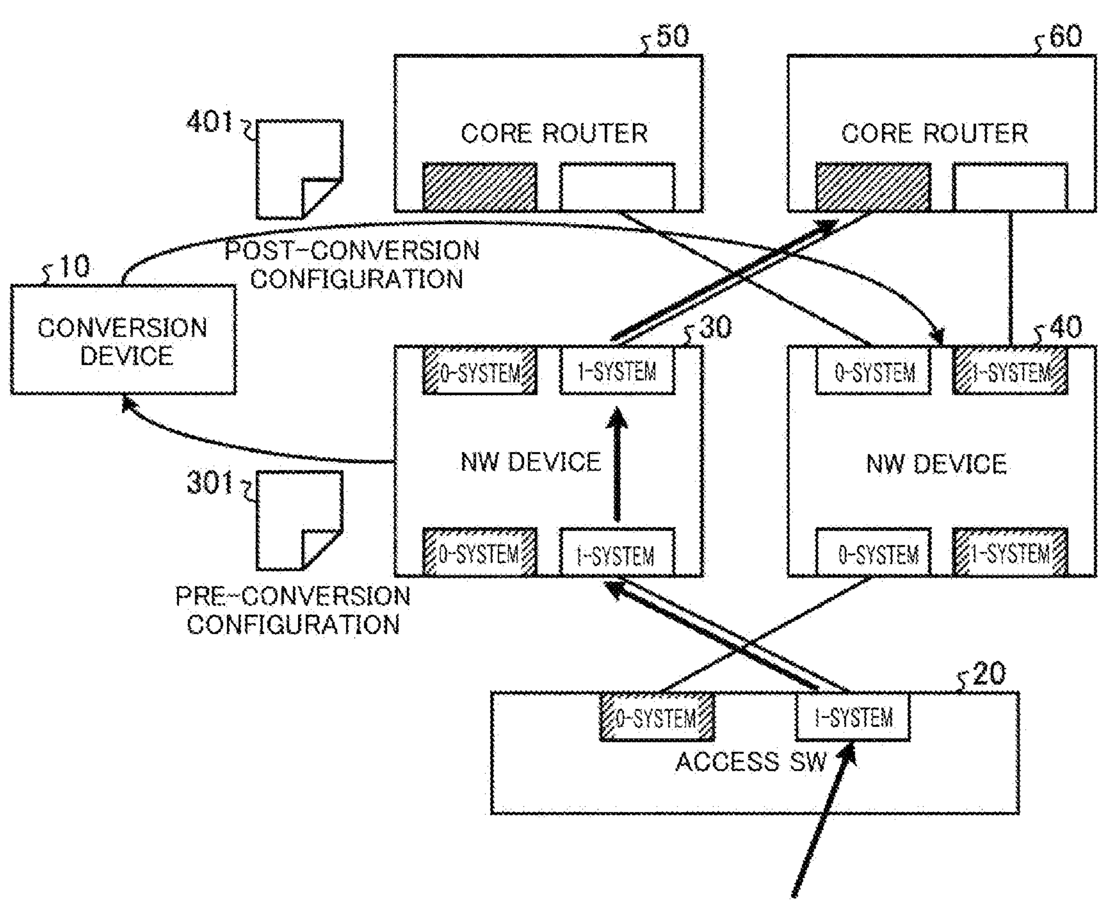
FIG. 2 is a diagram for explaining a configuration migration.

FIG. 2 is a diagram for explaining a configuration migration. As shown in FIG. 2, the conversion device 10 converts a configuration for the purpose of configuration migration.

The conversion device 10 generates a post-conversion configuration 401 on the basis of a pre-conversion configuration 301 acquired from the NW device 30. Then, the conversion device 10 outputs the generated post-conversion configuration 401. The conversion device 10 may input the configuration to the NW device 40 on the basis of the generated post-conversion configuration 401.

Figure 3:
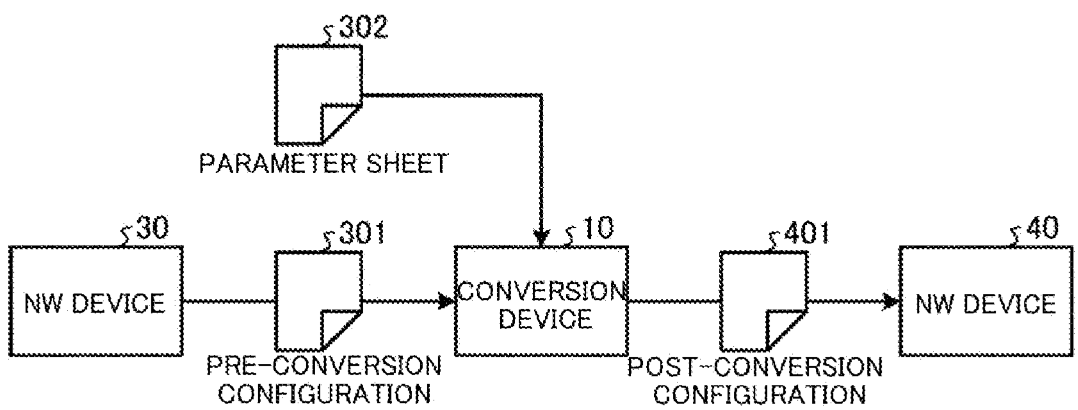
FIG. 3 is a diagram for explaining input and output of a conversion device.

As shown in FIG. 3, the conversion device 10 converts the configuration by referring to a parameter sheet 302. The parameter sheet 302 is an auxiliary file in conversion processing.

The parameter sheet 302 is a file in which values of variables set in the post-conversion configuration 401 are described.

For example, specific numerical values and character strings for each variable are described in the parameter sheet 302. An IP address set as a value of a variable is described in the parameter sheet 302.

For example, the pre-conversion configuration 301, the pre-conversion configuration 301, and the parameter sheet 302 are text files. The pre-conversion configuration 301, the pre-conversion configuration 301, and the parameter sheet 302 may be files in the form of XML and CSV.

Figure 4:
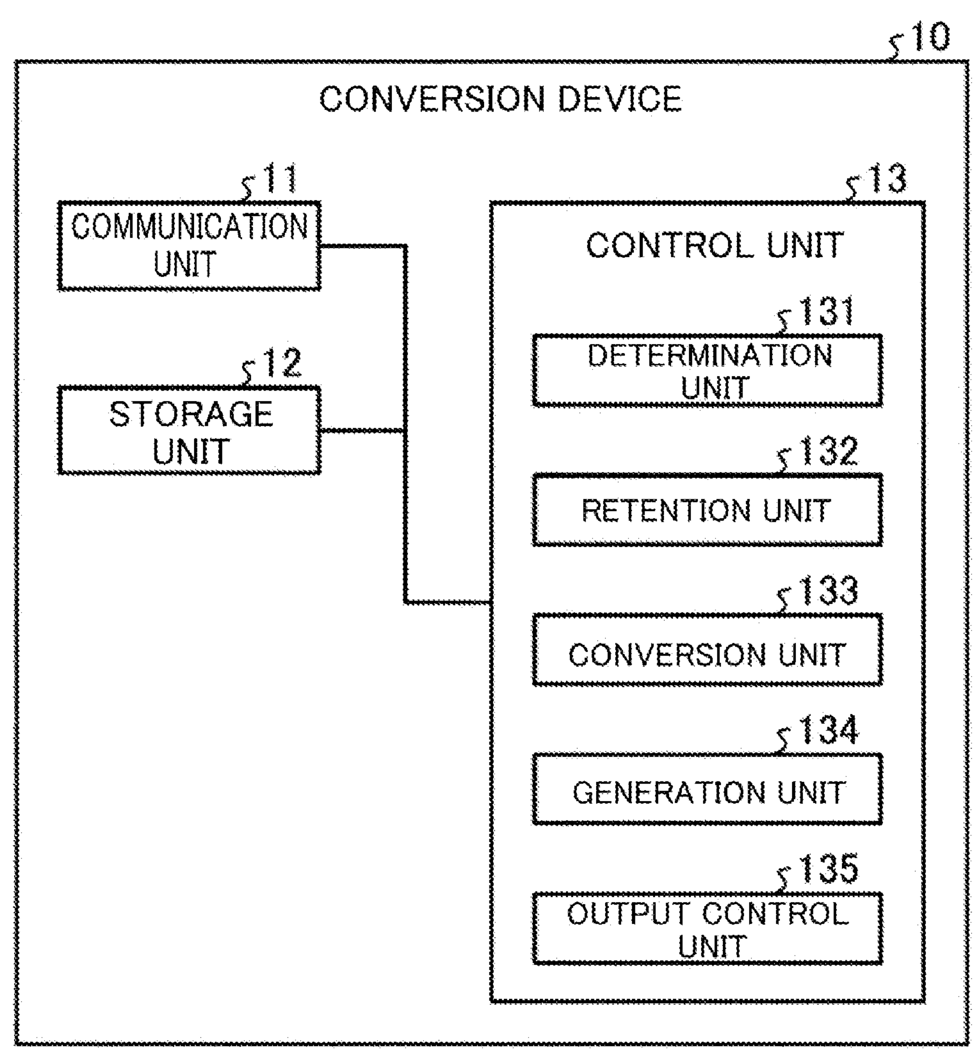
FIG. 4 is a diagram showing a configuration example of the conversion device.

A configuration of the conversion device according to the first embodiment will be described with reference to FIG. 4. FIG. 4 is a diagram showing a configuration example of the conversion device.

As shown in FIG. 1, the conversion device 10 includes a communication unit 11, a storage unit 12, and a control unit 13.

The communication unit 11 performs data communication with other devices. For example, the communication unit 11 transmits and receives data to and from the NW device 30 and the NW device 40.

The storage unit 12 is a storage device such as an HDD (Hard Disk Drive), an SSD (Solid State Drive), and an optical disc. It should be noted that the storage unit 12 may be a semiconductor memory in which data is rewriteable, such as a RAM (Random Access Memory), a flash memory, or an NVSRAM (Non Volatile Static Random Access Memory). The storage unit 12 stores an OS (Operating System) or various programs executed by the conversion device 10.

The control unit 13 controls the entire conversion device 10. For example, the control unit 13 is an electronic circuit such as a CPU (Central Processing Unit), an MPU (Micro Processing Unit), or a GPU (Graphics Processing Unit), or an integrated circuit such as an ASIC (Application Specific Integrated Circuit) or a FPGA (Field Programmable Gate Array).

Further, the control unit 13 includes an internal memory for retaining a program or control data that defines various processing procedures, and executes each processing using the internal memory.

Further, the control unit 13 functions as various processing units by operating various programs. For example, the control unit 13 includes a determination unit 131, a retention unit 132, a conversion unit 133, a generation unit 134, and an output control unit 135.

The determination unit 131 determines whether or not a designated file among a file received by the communication unit 11 or a file stored in the storage unit 12 is the pre-conversion configuration 301.

The retention unit 132 causes the storage unit 12 to retain data obtained by conversion.

For example, the retention unit 132 creates a temporary retention area in the storage unit 12. Then, the retention unit 132 writes the data obtained in the processing of the conversion unit 133 and the like described later into the temporary retention area.

The temporary retention area may be a temporary file of the same format as the post-conversion configuration 401.

The conversion unit 133 converts a command included in a configuration extracted from the NW device 30 that transfers data in the network into a command that can be set in the NW device 40 that transfers data in the network.

Here, it is assumed that one command is written per line in the pre-conversion configuration 301. In this case, the conversion unit 133 can convert the pre-conversion configuration 301 by one or more command units.

The conversion processing by the conversion unit 133 for each case is now described here. A program for performing conversion processing by the conversion unit 133 may be referred to as a tool.

Also, as a premise, there are various differences between the configurations of the NW device 30 and the NW device 40. For example, between the configuration of the NW device 30 and the configuration of the NW device 40, the size of fixed length data, the unit of a numerical value, the syntax, default setting items and contents thereof may be different from each other.

Also, items related to the NW device 30 are defined as pre-migration items. Also, the items related to the NW device 40 are defined as the post-migration items. For example, the configuration of the NW device 30 is a pre-migration configuration. For example, the configuration of the NW device 40 is a post-migration configuration.

In the following description, it is assumed that a command added by the conversion unit 133 is appropriately written into the temporary storage area or the post-conversion configuration 401 by the retention unit 132.

Also, whether or not each command is set in the configuration of each NW device, and the syntax of the command and the like, are determined according to the specification or operation method of the NW device.

Case 1| Before Migration: No Settings, After Migration: With Settings

For commands that are not set in the pre-migration configuration but are set in the post-migration configuration, the conversion unit 133 adds the commands to the post-migration configuration.

For example, when a command for setting the profile of hardware is included in the post-migration configuration and does not exist in the pre-conversion configuration 301, the conversion unit 133 adds the command for setting the profile of hardware to the post-conversion configuration 401.

Case 2| Before Migration: No Settings, After Migration: With Settings (Variable)

For commands that are not set in the pre-migration configuration but are set in the post-migration configuration and include variables, the conversion unit 133 adds the commands to the post-migration configuration together with variables acquired from the parameter sheet.

Here, it is assumed that the value of the variable <automatic log-out time> is "6000" in the parameter sheet 302. Note that <•> indicates a variable.

In this case, for example, if the command "username default_user exec-timeout <automatic log-out time>" is included in the post-migration configuration and does not exist in the pre-conversion configuration 301, the conversion unit 133 adds the command "username default_user exec-timeout 6000" to the post-conversion configuration 401.

In this manner, the conversion unit 133 converts the value of the variable of the command included in the configuration extracted from the NW device 30, on the basis of the parameter sheet 302 in which the value of the variable included in the configuration of the NW device 40 is described.

Case 3| Before Migration: With Settings, after Migration: No Settings

The conversion unit 133 deletes (does not add) a command having settings in the pre-migration configuration but not in the post-migration configuration in the post-migration configuration.

For example, when the command "system rlogin disable" is not included in the post-migration configuration and is present in the pre-conversion configuration 301, the conversion unit 133 does not add the command "system rlogin disable" to the post-conversion configuration 401.

For example, in the post-migration NW device (NW device 40), "system rlogin disable" is a default setting, and in some cases it is not necessary to specify the setting in the configuration.

In this manner, the conversion unit 133 deletes (does not add) a command included in the configuration (pre-conversion configuration 301) extracted from the NW device 30 when said command indicates the default setting in the NW device 40.

Case 4| Before Migration: With Settings, After Migration: With Settings

The conversion unit 133 performs conversion according to a conversion rule as necessary for a command having settings in the pre-migration configuration and also having settings in the post-migration configuration, and adds said command to the post-migration configuration.

For example, it is assumed that a command "link_debounce <connection standby time>" is included in the post-migration configuration, and a command "link debounce <connection standby time>" having the same meaning exists in the pre-conversion configuration 301.

The "link debounce <connection standby time>" and the "link debounce <connection standby time>" each have a variable corresponding to time, but are different in units. The unit of the variable <connection standby time> of the "link debounce <connection standby time>" is seconds, and the unit of the variable <connection standby time> of "link_debounce <connection standby time>" is milliseconds.

At this time, the conversion unit 133 performs conversion of units according to a conversion rule. For example, the conversion unit 133 converts "link_debounce 1" of the pre-conversion configuration 301 into "link debounce 1000" and newly adds it to the post-conversion configuration 401.

In this manner, the conversion unit 133 multiplies the value of the variable by 1000 in order to convert the unit of the variable from the seconds to the milliseconds.

Further, the conversion unit 133 may convert a command described in one line in the pre-conversion configuration 301 into a command with a plurality of lines. Conversely, the conversion unit 133 may convert a command described in a plurality of lines in the pre-conversion configuration 301 into a command with one line.

Case 5| Before Migration: With Settings or No Settings, after Migration: Change According to the Presence/Absence of Settings Before Migration The conversion unit 133 can change the settings of the post-migration configuration according to whether or not the pre-migration configuration has the settings.

For example, if a command specifying whether or not to perform a check is specified in the configuration, the NW device performs the check according to said command, and if no command specifying whether or not to perform a predetermined check operation is specified in the configuration, the NW device performs a default operation.

Here, it is assumed that the default operation is not checked (OFF) in the pre-migration NW device, and that the default operation is checked (ON) in the post-migration NW device.

For example, when a command "ip_nd_onlink_check" meaning that the check is performed exists in the pre-conversion configuration 301, the conversion unit 133 does not add a command designating whether or not the check is performed, to the post-conversion configuration 401. Thus, the post-migration NW device performs the check according to the default operation.

For example, if a command specifying whether or not to perform the check does not exist in the pre-conversion configuration 301, the conversion unit 133 adds said command "no ipv6 nd onlnk-check" to the post-conversion configuration 401, meaning that the check is not performed. Thus, the post-migration NW device does not perform the check according to the added command.

In this manner, the conversion unit 133 creates a command that represents default settings in the NW device 30 and can be set in the NW device 40.

The range for investigating the presence/absence of the settings before the migration differs depending on the NW device. For example, in some NW devices, it is necessary to investigate the control of the VLAN of the user.

The case 5 may not be determined from the description of one line of the pre-conversion configuration 301. Therefore, for example, if a line of the command "ip_nd_onlink_check" is found in the pre-conversion configuration 301, the conversion unit 133 causes a temporary storage area to temporarily retain (hold) this information and makes a determination regarding the addition of the command after checking subsequent lines.

Case 6| Before Migration: With Settings, after Migration: Change According to Pre-Migration Settings The conversion unit 133 can change the settings of the post-migration configuration according to the settings in the pre-migration configuration.

For example, the number of sessions permitted in a PPPoE connection is set to the variable <PPPoE maximum number of sessions> in the command "pppoe sessions <PPPoE maximum number of sessions>.".

In the post-migration NW device, the default value of the number of sessions permitted in a PPPoE connection is 2.

If the command "pppoe sessions 2" is set in the pre-conversion configuration 301, the conversion unit 133 does not add a command related the number of sessions permitted in a PPPoE connection, to the post-conversion configuration 401, because the value of the variable is equal to the default value.

On the other hand, if a command where the value of the variable differs from the default value, such as a command "pppoe sessions 4," is set in the pre-conversion configuration 301, the conversion unit 133 adds a command similar to said command in the post-conversion configuration 401.

Case 7| Other Cases

For cases which are not applicable to the cases described above, the conversion unit 133 performs conversion according to individually set logic.

For example, the conversion unit 133 converts the pre-migration command into the post-migration command as follows.

Pre-Migration Command:

```
line <core router side interface name> 10gigabit_ethernet 5/0
access_type core
ip nd_retrans_timer 60
line <core router side interface name> 10gigabit_ethernet 7/0
access_type core
ip nd_retrans_timer 60
```

Post-Migration Command:

```
if-profile common PROF_COMMON_BB
access-type core
ipv6 nd ns-interval 60000
interface tengigabitethernet 5/0.1
profile common PROF_COMMON_BB
interface tengigabitethernet 7/0.1
profile common PROF_COMMON_BB
```

In the pre-migration command, settings such as "access_type core" and "ip nd_retrans_timer 60" are performed one by one for each of the interfaces such as "10gigabit_ethernet 5/0" and "10gigabit_ethernet 7/0."

On the other hand, in the post-migration command, the settings "access_type core" and "ip nd_retrans_timer 60" are defined as "PROF_COMMON_BB," and "PROF_COMMON_BB" is set for each interface.

The generation unit 134 generates the post-conversion configuration 401 that can be input to the NW device 40, on the basis of a command obtained as a result of conversion by the conversion unit 133. For example, the generation unit 134 generates the post-conversion configuration 401 on the basis of the temporary storage area in which the data is retained by the retention unit 132.

The output control unit 135 controls the output of the post-conversion configuration 401. For example, the output control unit 135 outputs the post-conversion configuration 401 to a terminal device used by a manager.

The output control unit 135 may also input the configuration to the NW device 40 on the basis of the post-conversion configuration 401.

Processing of First Embodiment

Figure 5:
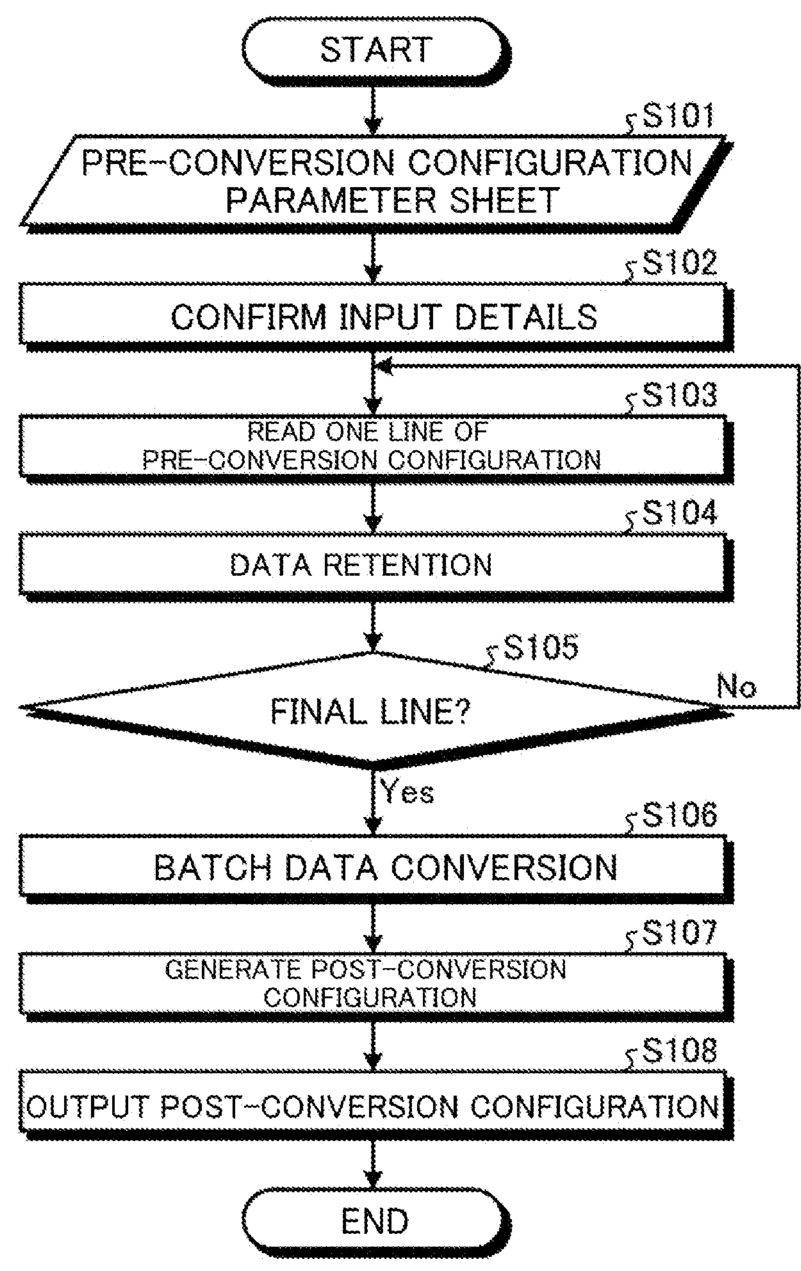
FIG. 5 is a flowchart showing a flow of processing of the conversion device.

FIG. 5 is a flowchart showing a flow of processing of the conversion device. As shown in FIG. 5, first, the conversion device 10 accepts input of the pre-conversion configuration 301 and the parameter sheet 302 (step S101).

Next, the conversion device 10 confirms the input details (step S102). For example, the conversion device 10 checks whether the file name, metadata, header at the beginning of the file and the like of the file input as the pre-conversion configuration 301 are legitimate.

Then, the conversion device 10 reads only one line of the pre-conversion configuration 301 (step S103). Then, the conversion device 10 performs data retention for each read line (step S104).

The data retention is the processing for converting a command of one line and adding the converted command to the post-conversion configuration 401 (or adding nothing). The data retention may correspond to the cases 1 to 7. In addition, the data retention includes trim processing, syntax analysis, and conversion.

When the read line is not the final line (step S105, No), the conversion device 10 returns to step S103 and reads the next line.

When the read line is the final line (step S105, Yes), the conversion device 10 performs batch data conversion (step S106).

The batch data conversion is the conversion processing that requires information of a plurality of lines or the whole. For example, as described with reference to the case 5, the conversion method may not be determined from the description of one line of the pre-conversion configuration 301.

Then, the conversion device 10 generates the post-conversion configuration 401 (step S107). For example, the conversion device 10 retrieves the data retained in the temporary storage area in the form of files that can be moved, copied, or the like.

Further, the conversion device 10 outputs the post-conversion configuration 401 (step S108). In doing so, the conversion device 10 may input the configuration to the NW device 40 on the basis of the generated post-conversion configuration 401.

Advantageous Effects of First Embodiment

As described above, the conversion unit 133 of the conversion device 10 converts a command included in a configuration extracted from the NW device 30 that transfers data in the network, into a command that can be set in the NW device 40 that transfers data in the network. The generation unit 134 generates a configuration that can be input to the NW device 40 on the basis of a command obtained as a result of conversion by the conversion unit 133.

In this manner, the conversion device 10 can automatically migrate the configuration between the NW devices. As a result, according to the embodiment, it is possible to efficiently replace NW devices having different configuration systems.

The conversion unit 133 converts the value of the variable of the command included in the configuration extracted from the NW device 30, on the basis of a parameter sheet in which the value of the variable included in the configuration of the NW device 40 is described. Thus, even when a specific variable value is required, the configuration can be automatically migrated.

The conversion unit 133 deletes the command when the command included in the configuration extracted from the NW device 30 indicates the default settings in the NW device 40. Accordingly, this allows unnecessary commands to be omitted.

The conversion unit 133 creates a command that represents the default settings in the NW device 30 and can be set in the NW device 40. Thus, the default settings of the NW device 30 can be reflected on the NW device 40 which is the migration destination.

The configuration can also be changed in real time according to the contract situation of the user. When the configuration is manually migrated, the steps of stopping the reflection of the contract situation to the configuration (SO (Service Order) regulation), thereafter sucking up the pre-migration configuration, causing an operation department to manually create a configuration operating equally, inputting said configuration to the post-migration NW device, and thereafter canceling the SO regulation are executed.

However, since the manual operation takes a long time, the time it takes to perform the SO regulation becomes long and the quality of the service deteriorates.

According to the embodiment, the migration of the configuration is automated, so that it is possible to shorten the SO regulation time or to omit the SO regulation.

In addition, conventional database porting techniques could be used for migrating configurations. On the other hand, the conventional database porting techniques have the following issues: assuming a specific database language (e.g., SQL), the data is a 1:1 correspondence conversion on a record-by-record basis, and it is impossible to check whether the data is ported correctly.

On the other hand, according to the embodiment, the parameter sheet 302 in the text format can cope with various languages, and the conversion of one line to a plurality of lines can be performed, and the correctness of the parameter can be secured.

System Configuration, Etc.

In addition, each component of each illustrated device is functionally conceptual, and does not necessarily need to be physically configured as shown. That is, specific forms of the distribution and integration of the respective devices are not limited to the illustrated forms. All or some of the forms of the distribution and integration of the respective devices can be distributed or integrated functionally or physically in any unit in accordance with various loads, usages, and the like. Furthermore, all or some of the processing functions performed by each device may be realized by a CPU (Central Processing Unit) and a program that is analyzed and executed by the CPU, or may be realized as hardware using wired logic. Note that the program may be executed not only by the CPU but also by another processor such as a GPU.

Further, all or some of the processing described as being performed automatically among the processing described in the present embodiment can be performed manually, and alternatively, all or some of the processing described as being performed manually can be performed automatically using a known method. In addition, information including the processing procedures, control procedures, specific names, and various types of data or parameters shown in the foregoing document and drawings can be arbitrarily changed unless otherwise specified.

Program

As an embodiment, the conversion device 10 can be implemented by installing a conversion program that executes the above-described conversion processing as package software or online software, in a desired computer. For example, by causing an information processing device to execute the above-described conversion program, the information processing device can function as the conversion device 10. Examples of the information processing device described here include desktop or laptop personal computers. In addition, examples of the information processing device also include mobile communication terminals such as smartphones, mobile phones, and PHSs (Personal Handyphone Systems), and slate terminals such as PDAs (Personal Digital Assistants).

Also, the conversion device 10 can be implemented as a conversion server device which provides a service related to the above-described conversion processing to a client which is a terminal device used by the user. For example, the conversion server device is implemented as a server device which provides a conversion service where a pre-conversion configuration is input and a post-conversion configuration is output. In this case, the conversion server device may be implemented as a Web server or as a cloud that provides a service related to the above-described conversion processing by means of outsourcing.

Figure 6:
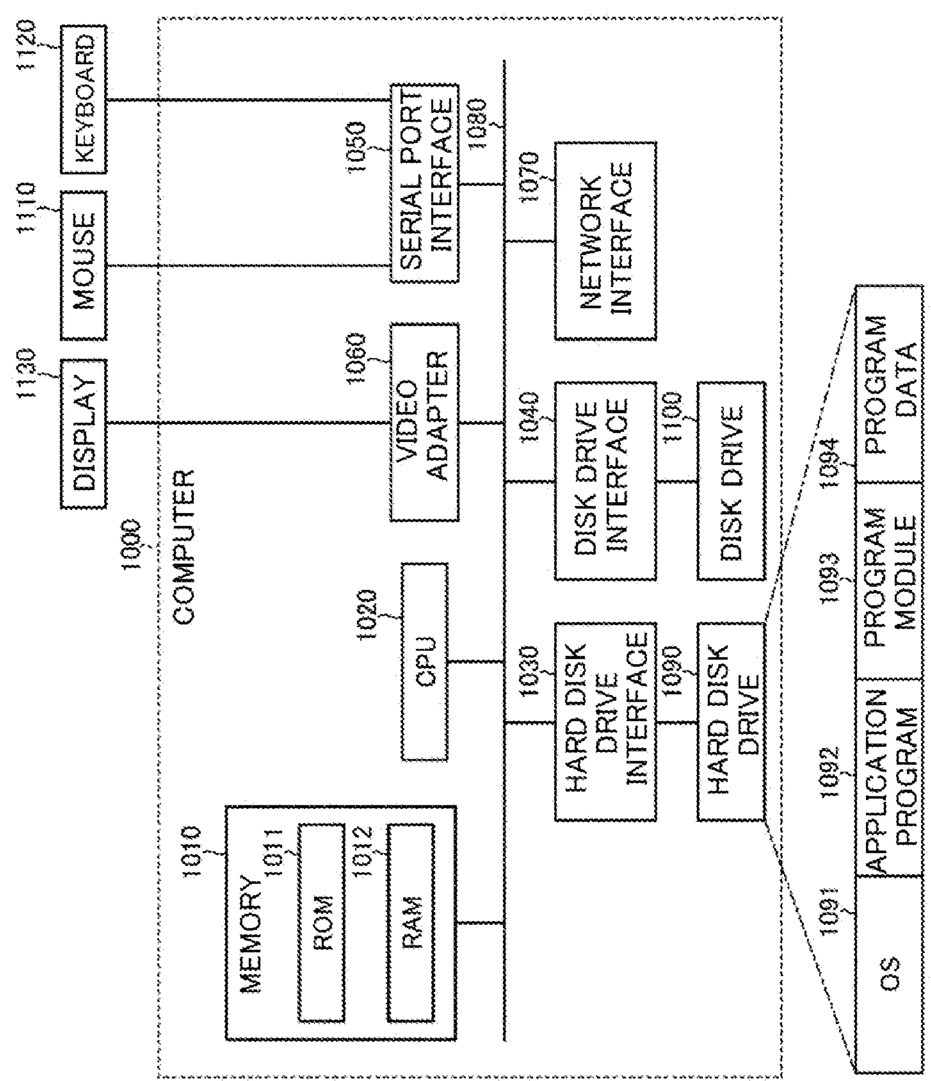
FIG. 6 is a diagram showing an example of a computer that executes a conversion program.

FIG. 6 is a diagram showing an example of a computer that executes the conversion program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected to one another via a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. More specifically, the program defining each kind of processing performed by the conversion device 10 is implemented as the program module 1093 in which a code executable by the computer is described. The program module 1093 is stored in, for example, the hard disk drive 1090. For example, the program module 1093 for executing processing similar to the functional configuration of the conversion device 10 is stored in the hard disk drive 1090. Note that the hard disk drive 1090 may be replaced with an SSD (Solid State Drive).

Further, configuration data to be used in the processing of the embodiment described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the processing of the above-described embodiment.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (LAN (Local Area Network), a WAN (Wide Area Network), or the like). Then, the program module 1093 and the program data 1094 may be read by the CPU 1020 from another computer via the network interface 1070.

REFERENCE SIGNS LIST

10 Conversion device
11 Communication unit

12 Storage unit
13 Control unit
20 Access SW
30, 40 NW device
50, 60 Core router
131 Determining unit
132 Retention unit
133 Conversion unit
134 Generation unit
135 Output control unit
301 Pre-conversion configuration
401 Post-conversion configuration

The invention claimed is:

1. A conversion device, comprising:

at least one processor; and memory storing instructions that, when executed by the at least one processor, causes the system to perform a set of operations, the set of operations comprising:

converting a command included in a configuration extracted from a first network device that transfers data in a network, into a command that is set in a second network device that transfers data in the network; and generating a configuration that is input to the second network device, on the basis of a command obtained as a result of conversion, wherein a value of a variable of the command included in the configuration extracted from the first network device is converted, based on a parameter sheet in which a value of a variable included in a configuration of the second network device, by automatically adding new value to the variable of the command when the parameter sheet of the second network device is different from the configuration extracted from the first network device.

2. The conversion device according to claim 1, wherein deletes the command included in the configuration extracted from the first network device is deleted when the command indicates a default setting in the second network device.

3. The conversion device according to claim 1, wherein a command that represents a default setting in the first network device is created and is set in the second network device.

4. A conversion method executed by a conversion device, the method comprising:

converting a command included in a configuration extracted from a first network device that transfers data in a network, into a command that is set in a second network device that transfers data in the network; and generating a configuration that is input to the second network device, on the basis of a command obtained as a result of conversion wherein a value of a variable of the command included in the configuration extracted from the first network device is converted, based on a parameter sheet in which a value of a variable included in a configuration of the second network device, by automatically adding new value to the variable of the command when the parameter sheet of the second network device is different from the configuration extracted from the first network device.

5. The conversion method according to claim 4, wherein a value of a variable of the command included in the configuration extracted from the first network device is converted, on the basis of a parameter sheet in which a value of a variable included in a configuration of the second network device.

6. The conversion method according to claim 4, wherein the command included in the configuration extracted from the first network device is deleted when the command indicates a default setting in the second network device.

7. The conversion method according to claim 4, wherein a command that represents a default setting in the first network device is created and is set in the second network device.

8. A computer-readable non-transitory recording medium storing computer-executable program instructions that when executed by a processor cause a computer to execute a conversion method comprising:

converting a command included in a configuration extracted from a first network device that transfers data in a network, into a command that is set in a second network device that transfers data in the network; and generating a configuration that is input to the second network device, on the basis of a command obtained as a result of conversion, wherein a value of a variable of the command included in the configuration extracted from the first network device is converted, based on a parameter sheet in which a value of a variable included in a configuration of the second network device, by automatically adding new value to the variable of the command when the parameter sheet of the second network device is different from the configuration extracted from the first network device.

9. The computer-readable non-transitory recording medium according to claim 8 wherein the conversion method further comprises:

the command included in the configuration extracted from the first network device is deleted when the command indicates a default setting in the second network device.

10. The computer-readable non-transitory recording medium according to claim 8 wherein the conversion method further comprises:

a command that represents a default setting in the first network device is created and is set in the second network device.

* * * * *